C. C. CARPENTER.
STORAGE BATTERY CONSTRUCTION.
APPLICATION FILED SEPT. 20, 1919.
1,380,770.
Patented June 7, 1921.
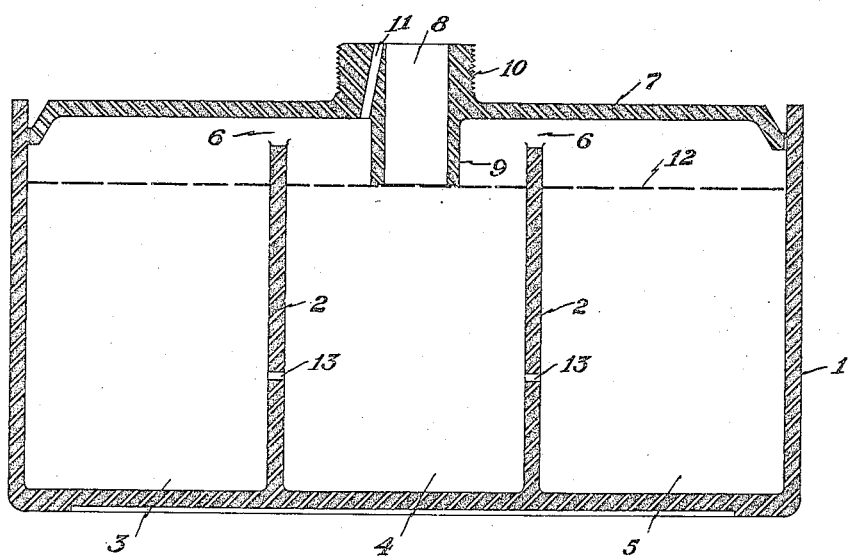
WITNESS:
INVENTOR.
Campbell C. Carpenter
BY
ATTORNEY.

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

1,380,770.   Specification of Letters Patent.   Patented June 7, 1921.

Application filed September 20, 1919. Serial No. 325,173.

*To all whom it may concern:*

Be it known that I, CAMPBELL C. CARPENTER, a citizen of the United States, residing at Niagara Falls, in the county of Niagara and State of New York, have invented new and useful Improvements in Storage-Battery Construction, of which the following is a specification.

The present invention relates to storage battery construction.

Storage batteries are commonly made up of juxtaposed cells, said cells being independent of one another except for their outside connections, each cell being provided with filling and ventilating apertures and with corresponding means for preventing the ingress of foreign material.

An object of the present invention is to provide a simplified storage battery construction.

A further object is to provide a storage battery construction wherein a plurality of juxtaposed cells may be filled with electrolyte to a predetermined level though only one of said cells is provided with the customary filling aperture.

Other objects will appear as the description proceeds.

The drawing is a sectional view illustrating one embodiment of the present invention.

The numeral 1 indicates a storage battery casing having intermediate walls 2, 2, which provide three cells which are indicated by the numerals 3, 4 and 5. The walls, 2, 2 do not extend to the top of the battery, there being spaces 6, 6 left between the cover 7 and the top of said walls 2, 2. The cover 7 is tightly sealed to the casing 1. Only one filling aperture for the battery need be provided according to the present invention. Said aperture is indicated by the numeral 8. The cells 3, 4 and 5 will be provided with the usual plates, separators and connecting posts. Said plates, separators and posts have not been illustrated herein, inasmuch as they form no part of the present invention, and their illustration does not aid in a complete understanding of the present invention. On the under side of the cover 7 is a collar 9 surrounding the aperture 8. On the upper side of the cover 7 is a collar 10 which may be eccentric with the aperture 8, whereby to provide a thickened portion through which extends the vent 11.

The normal level of the electrolyte in the three cells 3, 4 and 5 is represented by the broken line 13, which, it will be noted, coincides with the bottom of collar 9. Extending through walls 2, 2 are small apertures 13, 13, which apertures 13, 13 are located below the line representing the normal level of the electrolyte. It will be obvious that if the apertures 13, 13 are placed only slightly below the normal level of the electrolyte, a slight drop below said level will reduce the electrolyte level to a point below said apertures, whereby there will be no short-circuiting between compartments through said apertures. Such reduction in the acid level below normal frequently occurs in practice and does no harm. The walls 2, 2 extend above the normal level of the electrolyte.

The apertures 13, 13 provide communication between the cells of the battery whereby to permit the passage of electrolyte. The cross sectional areas of the apertures 13, 13 should be relatively small, whereby to avoid reducing the resistance between the cells to such a low value that the voltage at the terminals of the battery will be sufficient to send a substantial discharging current through the interior of the battery.

It will be evident that when the operator desires to add liquid to the battery, he will pour said liquid through filling aperture 8. Liquid will pass through the apertures 13, 13 into the cells 3 and 5. Air will escape from cells 3 and 5 above the electrolyte through the spaces 6, 6, thence through the vent 11 to the outside.

The casing 1 has been illustrated as being of integral construction. This integral construction is not necessary, however. Three separate cells may be placed in juxtaposition, the walls sealed together and provided with apertures whereby communication may be had between the cells below the electrolyte level.

The battery, according to the present invention, is cheap to manufacture and has fewer parts to break than in the ordinary construction. The fact that only one filling aperture is needed for the complete battery is of importance, particularly when the battery is to be put in the hands of the ordinary motorist to whom the ordinary attention required for a battery is a great bother.

One embodiment of the present invention has been described in detail. Many modifications will occur to those skilled in the art. It is intended in this patent to cover all such modifications that come within the scope of the invention as defined by the appended claims.

What I claim as new and desire to secure by letters patent of the United States is—

1. A storage battery having a plurality of compartments, said compartments being separated by walls having apertures to permit the passage of electrolyte, said apertures being sufficiently small to provide a sufficient resistance, through the interior of said battery to prevent the voltage at the terminals of said battery from sending a substantial discharging current through the interior of said battery.

2. A storage battery having a plurality of compartments separated by walls, each of said separating walls providing a passageway above the normal level of the electrolyte in said battery, and another relatively small aperture below said level.

3. A storage battery having a plurality of compartments separated by walls, each of said separating walls having an aperture below the normal level of the electrolyte in said battery.

4. A storage battery comprising a plurality of cells, the electrolyte being in communication throughout said battery, insulating walls being provided to separate said cells, said walls being sufficient in extent to provide an electrical resistance through the electrolyte of the battery to prevent a substantial discharge through said electrolyte.

In witness whereof I have hereunto subscribed my name.

CAMPBELL C. CARPENTER.